United States Patent [19]

MacMillan

[11] Patent Number: 5,010,998

[45] Date of Patent: Apr. 30, 1991

[54] DIVERTER

[75] Inventor: Colin G. MacMillan, Cirencester, England

[73] Assignee: The Post Office, London, United Kingdom

[21] Appl. No.: 373,929

[22] Filed: Jun. 29, 1989

[30] Foreign Application Priority Data

Jul. 7, 1988 [GB] United Kingdom ............ 8816218.5

[51] Int. Cl.⁵ .............................................. B65G 47/46
[52] U.S. Cl. .................................... 198/372; 198/362; 198/367
[58] Field of Search ................ 198/362, 367, 372

[56] References Cited

U.S. PATENT DOCUMENTS

| | | | |
|---|---|---|---|
| 3,026,988 | 3/1962 | Fisk | 198/372 |
| 3,146,875 | 9/1964 | McGow et al. | 198/372 X |
| 3,920,541 | 11/1975 | Vandenberg et al. | 198/372 X |
| 4,298,117 | 11/1981 | Kobayashi et al. | 198/367 |
| 4,595,091 | 6/1986 | Slopatz et al. | 198/372 |
| 4,643,291 | 2/1987 | Counter et al. | 198/367 |

FOREIGN PATENT DOCUMENTS

| | | |
|---|---|---|
| 2620036 | 11/1977 | Fed. Rep. of Germany . |
| 3415133 | 10/1985 | Fed. Rep. of Germany . |
| 0036820 | 3/1983 | Japan .................................. 198/367 |
| 58-36820A | 3/1983 | Japan . |
| 0257098 | 8/1926 | United Kingdom ................ 198/372 |
| 1369366 | 10/1974 | United Kingdom . |
| 1568416 | 5/1980 | United Kingdom . |
| 2123375 | 2/1984 | United Kingdom . |

*Primary Examiner*—Robert P. Olszewski
*Assistant Examiner*—James R. Bidwell
*Attorney, Agent, or Firm*—Merchant & Gould

[57] ABSTRACT

A diverter for diverting articles travelling on a conveyor, comprises a diverter member (1) which is mounted on a linkage for movement into and out of the path of the articles and which has an elongate article contact surface to cooperate with the articles travelling on the conveyor. The linkage includes a pivotal connection (4a) with the diverter member (1) intermediate the length of the surface so that the diverter member (1) on contact with each article gives the article a sustained push to guide the article laterally of the conveying direction followed by a final nudge to complete the lateral displacement.

8 Claims, 1 Drawing Sheet

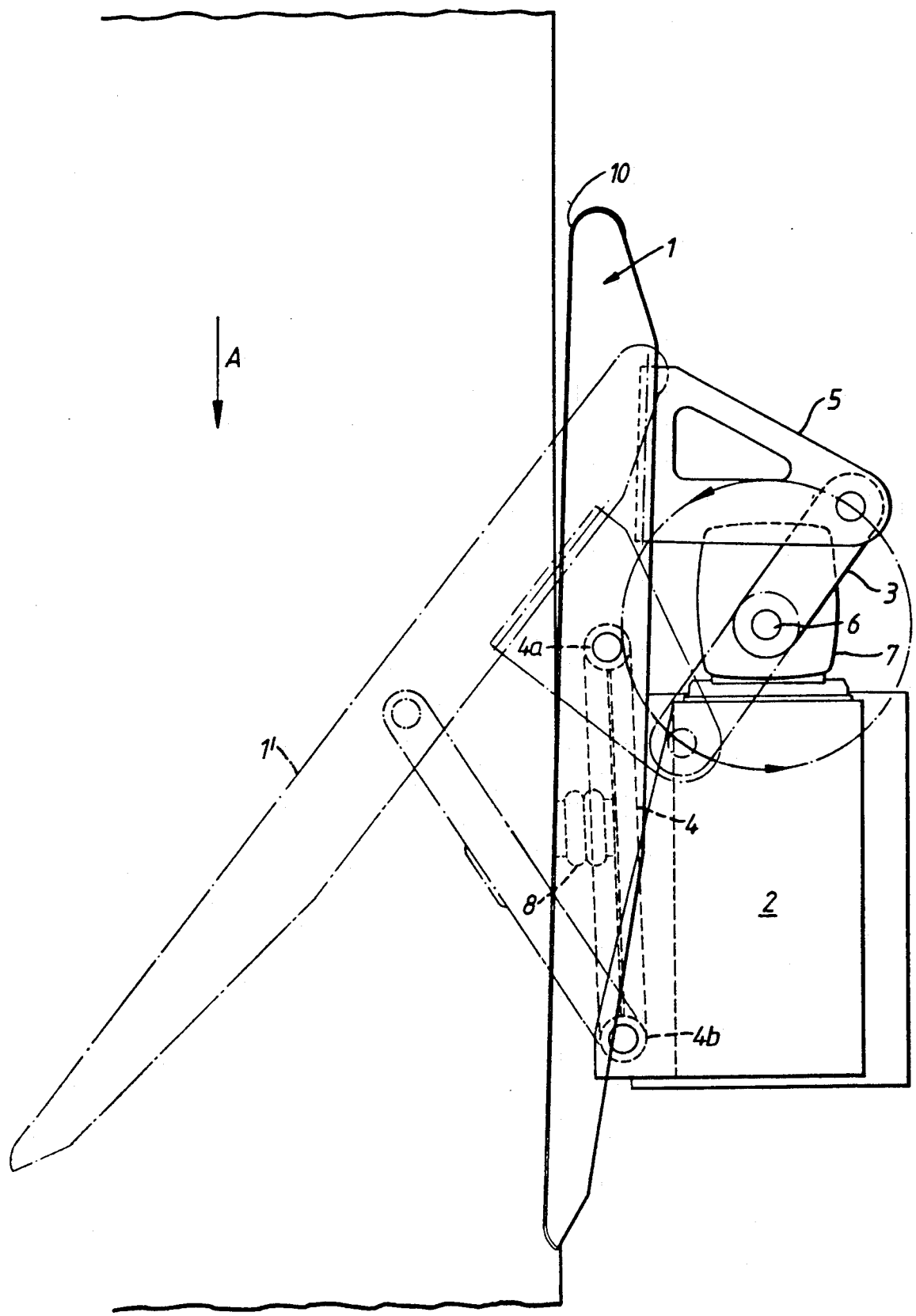

DIVERTER

This invention relates to a diverter for diverting articles travelling on a conveyor.

In one method of sorting postal items, the items to be sorted are fed on to a conveyor having a number of lateral exits each of which constitutes a sorting destination and it is therefore required to divert the items selectively into the required destinations.

One known method is to lower a diverter blade into the path of a given item to be diverted, such a diverter then presenting a stationary obstruction to the approaching item. However, this requires a low coefficient of friction between the carrying surface and the item at least as regards lateral movement of the item on the conveyor. This is rarely the case in practice and the items tend to jam or are subjected to undue lateral forces which is unacceptable particularly in the case of fragile items.

The invention has for its object the provision of an improved diverter which overcomes the above disadvantage or at least represents an improvement over the known diverters.

According to the present invention, a diverter for diverting articles travelling on a conveyor, comprises a diverter member which is mounted on a linkage for movement into and out of the path of the articles and which has an elongate article contact surface to cooperate with the articles travelling on the conveyor, the linkage including a pivotal connection with the diverter member intermediate the length of the surface so that the diverter member on contact with each article gives the article a sustained push to guide the article laterally of the conveying direction followed by a final nudge to complete the lateral displacement.

In many instances the purpose of laterally displacing the articles on the conveyor will be to divert them to the conveyor edge when the final nudge will discharge them from the conveyor.

In a preferred construction, the diverter member is connected to a fixed member by means of two spaced links which form with the diverter member and the fixed member, a four bar linkage.

One form of diverter in accordance with the invention will now be described with reference to the accompanying drawing.

Referring to the drawing, a diverter blade 1 is mounted on a base 2 by means of two links 3 and 4. In more detail, the blade 1 carries a projecting arm 5 to which the link 3 is attached and whereas the link 4 is attached directly to the base 2, the link 3 is driveably connected to the output shaft 6 of a motor and gear reduction unit 7 which is itself secured to the base 2. For convenience, the pivots between the link 4 and diverter blade and between this link and the mounting have been referenced 4a and 4b respectively.

The link 3 of course, forms a crank and on rotation of the shaft 6 in the anti-clockwise direction, as seen in the figure, the blade 1 moves away from the position shown to the left in the drawing, this movement being initially a general bodily movement. Further rotation of the crank moves the blade clockwise about the pivot 4a into the position indicated diagrammatically at 1'. Continued movement of the crank pulls the blade back about the pivot 4b and then rotates the blade anti-clockwise about the pivot 4a back into the initial position shown. This compound reciprocatory and oscillatory movement is of course, the movement of a four bar chain. A buffer 8 is mounted on the link 4 to dampen the movement of the blade 1 as it moves into the position shown.

In use, the diverter is positioned adjacent a sorting conveyor, for example a parcel sorting conveyor, the parcels on which advance towards the diverter as shown by the arrow A. On operation of the diverter, the upper part of the blade 1 moves into contact with the approaching parcel and, as the parcel moves down the contact surface of the blade, gives the parcel a sustained push to guide the parcel towards the conveyor edge followed by a final nudge as the blade pivots clockwise about the pivot 4a, to discharge the article from the conveyor.

The sustained push of the parcel by the blade serves to overcome the lateral frictional force of the conveying surface on the parcel without jolting the parcel at all and the final nudge of the blade discharges the parcel from the conveyor.

With careful selection of the position of the diverter and the speed of operation of the diverter in relation to the speed of the conveyor, parcels may be satisfactorily diverted off the conveyor without being subjected to any sudden and unacceptably high forces. In fact it has been found that the diverter of the present invention permits a much more close parcels pitch than the known diverters. Typically with a conveyor speed of three meters per second and a diverter cycle time of 0.7 seconds, up to 80 parcels per minute (approximately 5000 per hour) may be handled.

Modifications to the precise arrangement shown are possible. In particular, if desired, the connection between the arm 5 and the blade 1 may be by means of a pivot joint permitting movement between the arm and the blade about an axis perpendicular to the general plane of the conveyor.

Furthermore a scraper bar 10 may if desired, be fitted to the bottom of the diverter blade, the scraper bar being of belting or other thin flexible material, to prevent thin items, e.g. Jiffy bags, passing under the diverter blade.

I claim:

1. A diverter for diverting articles travelling on a conveyor, laterally of the conveying direction, comprising a diverter member which is mounted on a linkage for movement into and out of the path of the articles and which has an elongate article contact part to cooperate with the articles travelling on the conveyor, the linkage including a pivotal connection with the diverter member intermediate the length of the part, the arrangement of the linkage being such that the movement of the diverter member into the path of each article comprises an initial generally bodily movement in which the diverter member pivots about said pivotal connection to a small degree to enhance the diverting action of the portion of the article contact part nearer the approach of the articles such that the article contact parts pivots into the article path to give the article a sustained push, followed by a pivoting movement about said pivotal connection in the opposite direction such that the near portion of the article contact part moves out of the article path while pivoting that portion of the article into the article path to give the article a final nudge to complete the lateral displacement.

2. A diverter as set forth in claim 1, in which the diverter member is connected to a fixed member by means of first and second spaced links which form with the diverter member and the fixed member, a four bar linkage.

3. A diverter as set forth in claim 2, in which the diverter member carries a laterally projecting arm to the free end of which a first one of the links is connected.

4. A diverter as set forth in claim 3, in which the arm is connected to the diverter member to permit and said diverter member to pivot together about an axis perpendicular to the general plane of the conveyor.

5. A diverter as set forth in claim 3, in which a buffer is interposed between the diverter member and the second link.

6. A diverter as set forth in claim 1, in which a flexible scraper bar is fitted to the diverter member to project below the diverter member towards the conveyor.

7. A diverter for laterally diverting articles travelling in a path on a conveyor from a point upline to a point downline, comprising:
   (a) an elongate diverter member having first and second ends, said first end being upline from said second end;
   (b) first means for moving said diverter member initially generally laterally across the conveyor;
   (c) second means for moving said diverter member first end into the path of the conveyed articles;
   (d) third means for retracting said diverter member first end out of the path of the conveyed articles while simultaneously moving said diverter member second end into the path of the conveyed articles; and
   (e) drive means for activating said first, second, and third moving means.

8. A diverter for laterally diverting articles travelling on a conveyor from a point upline to a point downline on a conveyor, comprising:
   (a) an elongate diverter member having first and second ends, said first end being upline from said second end; and
   (b) linkage means for moving said diverter member laterally across said conveyor; said linkage means including a first crank link mounted on an output shaft for rotational movement thereon, said crank link pivotally mounted to said diverter member; said linkage means further including an anchor link pivotally mounted at one end to ground and at an opposite end to said diverter member;
   (c) said linkage means being constructed and arranged to move said first end of said diverter member laterally into the path of the conveyor and subsequently, upon further rotation of said crank link, to move said second end of said diverter member into the path of the conveyed articles while simultaneously retracting said first end of said diverter member out of the path of the conveyed articles.

* * * * *

UNITED STATES PATENT AND TRADEMARK OFFICE
CERTIFICATE OF CORRECTION

PATENT NO. : 5,010,998

DATED : 30 April 1991

INVENTOR(S) : Colin G. MacMillan

It is certified that error appears in the above-identified patent and that said Letters Patent is hereby corrected as shown below:

Column 2, line 58 delete "parts" and insert --part--.

Column 2, line 63 insert --contact part further from the approach of the articles-- after "portion of the article"

Column 3, line 8 insert --said arm-- after the word "permit".

Signed and Sealed this

Eighth Day of December, 1992

Attest:

DOUGLAS B. COMER

*Attesting Officer*     Acting Commissioner of Patents and Trademarks